(12) United States Patent
Wang et al.

(10) Patent No.: US 11,914,730 B2
(45) Date of Patent: Feb. 27, 2024

(54) DATA STORAGE METHOD, APPARATUS AND DEVICE, DATA VERIFICATION METHOD, APPARATUS AND DEVICE, AND MEDIUM

(71) Applicant: Tencent Technology (Shenzhen) Company Limited, Shenzhen (CN)

(72) Inventors: Dongyan Wang, Shenzhen (CN); Maocai Li, Shenzhen (CN); Rui Guo, Shenzhen (CN); Haitao Tu, Shenzhen (CN); Bo Li, Shenzhen (CN); Zongyou Wang, Shenzhen (CN); Jianjun Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 869 days.

(21) Appl. No.: 16/991,977

(22) Filed: Aug. 12, 2020

(65) Prior Publication Data
US 2020/0372167 A1 Nov. 26, 2020

Related U.S. Application Data

(63) Continuation of application No. PCT/CN2019/092410, filed on Jun. 21, 2019.

(30) Foreign Application Priority Data

Jul. 5, 2018 (CN) .......................... 201810731377.2

(51) Int. Cl.
*G06F 21/62* (2013.01)
*G06F 3/06* (2006.01)

(52) U.S. Cl.
CPC ........ *G06F 21/6218* (2013.01); *G06F 3/0604* (2013.01); *G06F 3/067* (2013.01); *G06F 3/0619* (2013.01); *G06F 3/0649* (2013.01)

(58) Field of Classification Search
CPC .............. G06F 21/6218; G06F 3/0604; G06F 3/0619; G06F 3/0649; G06F 3/067;
(Continued)

(56) References Cited

U.S. PATENT DOCUMENTS

| 10,755,226 B1* | 8/2020 | Robyak ............... G06K 7/1413 |
| 11,063,745 B1* | 7/2021 | Du ........................ H04L 9/0825 |
| 2010/0127868 A1 | 5/2010 | Hamilton, II et al. |
| 2016/0098723 A1 | 4/2016 | Feeney |

(Continued)

FOREIGN PATENT DOCUMENTS

| CN | 105608588 A | 5/2016 |
| CN | 107018125 A | 8/2017 |

(Continued)

OTHER PUBLICATIONS

Tencent Technology, WO, PCT/CN2019/092410, dated Sep. 25, 2019, 4 pgs.

(Continued)

*Primary Examiner* — Techane Gergiso
(74) *Attorney, Agent, or Firm* — Morgan, Lewis & Bockius LLP

(57) ABSTRACT

A data storage method is provided at a computer system, including: obtaining first data and second data of a target object, the first data and the second data being data of different dimensions for measuring any aspect of the target object from generation to existence; storing the first data and the second data of the target object in the first node; receiving audit information of the first node for indicating the first data and the second data stored in the first node; verifying the audit information based on target audit information of at least one target node that transacts with the first node; broadcasting a verification success notification in the data storage system in a case that the verification succeeds; and determining that a consensus on the audit information is (Continued)

reached in a case that the received verification success notification meets a consensus success condition.

20 Claims, 5 Drawing Sheets

(58) Field of Classification Search
CPC .......... G06F 21/64; G06F 16/27; G06F 16/22; G06F 16/24
See application file for complete search history.

(56) References Cited

U.S. PATENT DOCUMENTS

| | | | |
|---|---|---|---|
| 2017/0221052 A1* | 8/2017 | Sheng | ................. H04L 9/14 |
| 2017/0228731 A1* | 8/2017 | Sheng | ................. G06Q 20/36 |
| 2017/0344435 A1* | 11/2017 | Davis | ................. G06F 11/1464 |
| 2018/0150835 A1* | 5/2018 | Hunt | ................. G06Q 20/3827 |
| 2018/0337769 A1* | 11/2018 | Gleichauf | ................. G06F 21/645 |
| 2019/0108362 A1* | 4/2019 | Miller | ................. G06F 21/60 |
| 2021/0058410 A1* | 2/2021 | Su | ................. H04L 9/50 |

FOREIGN PATENT DOCUMENTS

| | | |
|---|---|---|
| CN | 107124403 A | 9/2017 |
| CN | 107493340 A | 12/2017 |
| CN | 107506917 A | 12/2017 |
| CN | 107578337 A | 1/2018 |
| CN | 107911373 A | 4/2018 |
| CN | 107944892 A | 4/2018 |
| CN | 108226390 A | 6/2018 |
| JP | 2003044662 A | 2/2003 |
| KR | 101871468 B1 | 6/2018 |
| WO | WO 2017194976 A1 | 11/2017 |
| WO | WO 2018013934 A1 | 1/2018 |

OTHER PUBLICATIONS

Tencent Technology, IPRP, PCT/CN2019/092410, dated Jan. 5, 2021, 5 pgs.

Tencent Technology, ISR, PCT/CN2019/092410, dated Sep. 25, 2019, 2 pgs.

"Blockchain: The Solution for Transparency in Product Supply Chains", Nov. 21, 2015, XP055392270, 22 pgs., Retrieved from the Internet: https://www.provenance.org/whitepaper.

Jon-Amerin Vorabutra, "Why Blockchain is a Game Changer for Supply Chain Management Transparency", Oct. 3, 2016, XP055392285, 9 pgs., Retrieved from the Internet: https://www.supplychain247.com/article/why_blockchain_is_a_game_changer_for_the_supply_chain/trends.

* cited by examiner

Data storage system

DATA STORAGE METHOD, APPARATUS AND DEVICE, DATA VERIFICATION METHOD, APPARATUS AND DEVICE, AND MEDIUM

CROSS REFERENCE TO RELATED APPLICATIONS

This application is a continuation application of PCT Patent Application No. PCT/CN2019/092410, entitled "DATA STORAGE METHOD, APPARATUS AND DEVICE, DATA VERIFICATION METHOD, APPARATUS AND DEVICE, AND MEDIUM" filed on Jun. 21, 2019, which claims priority to Chinese Patent Application No. 201810731377.2, entitled "DATA STORAGE METHOD, DATA VERIFICATION METHOD, APPARATUS, DEVICE, AND MEDIUM" filed Jul. 5, 2018, all of which are incorporated by reference in their entirety.

FIELD OF THE TECHNOLOGY

This application relates to the field of network technologies, and in particular, to a data storage method, a data verification method, an apparatus, a device, and a storage medium.

BACKGROUND OF THE DISCLOSURE

With the development of block chain technologies, an increasing quantity of services begin to use block chains as a storage medium for data storage and sharing. However, during application of the block chain technologies, only traceability of data on a chain can be ensured. The data on the chain may not be real, that is, the data on the chain is not related to actual production and life. Therefore, such technologies are highly restricted and cannot assist in real production.

SUMMARY

Embodiments of this application provide a data storage method, a data verification method, an apparatus, a device, and a storage medium.

A data storage method, executed by a data storage system including a first node and a second node that is communicatively connected to the first node, the method comprising:
  obtaining first data of a target object;
  obtaining second data of the target object, the first data and the second data being data of different dimensions, the dimensions being information for measuring any aspect of the target object from generation to existence;
  storing the first data and the second data of the target object in the first node;
  receiving audit information of the first node, the audit information being used for indicating the first data and the second data stored in the first node;
  verifying the audit information based on target audit information of at least one target node, wherein the target audit information is used for indicating data stored by the at least one target node that transacts with the first node;
  broadcasting a verification success notification in the data storage system in a case that the verification succeeds; and
  determining that a consensus on the audit information is reached in a case that the received verification success notification meets a consensus success condition.

A data storage system comprising a first node and a second node that is communicatively connected to the first node, wherein each of the first node and the second node has a processor and a memory, the memory storing at least one instruction, the instruction being loaded and executed by the processor to perform the foregoing data verification method.

A non-transitory computer-readable storage medium in connection with a data storage system having a first node and a second node that is communicatively connected to the first node, the storage medium storing at least one instruction, the instruction being loaded and executed by a processor of one of the first node and the second node to perform the foregoing data verification method.

Details of one or more embodiments of this application are provided in the following accompanying drawings and description. Other features, objectives and advantages of this application will become more evident from the specification, the accompanying drawings and the claims.

BRIEF DESCRIPTION OF THE DRAWINGS

To describe the technical solutions in the embodiments of this application more clearly, the following briefly introduces the drawings required for descripting the embodiments. Apparently, the drawings in the following description show merely some embodiments of this application. Other drawings may further be derived from these drawings by a person of ordinary skill in the art without creative efforts.

DESCRIPTION OF EMBODIMENTS

To make the objectives, technical solutions and advantages of this application clearer, implementations of this application are described in further detail in the following with reference to the accompanying drawings.

Figure 1:
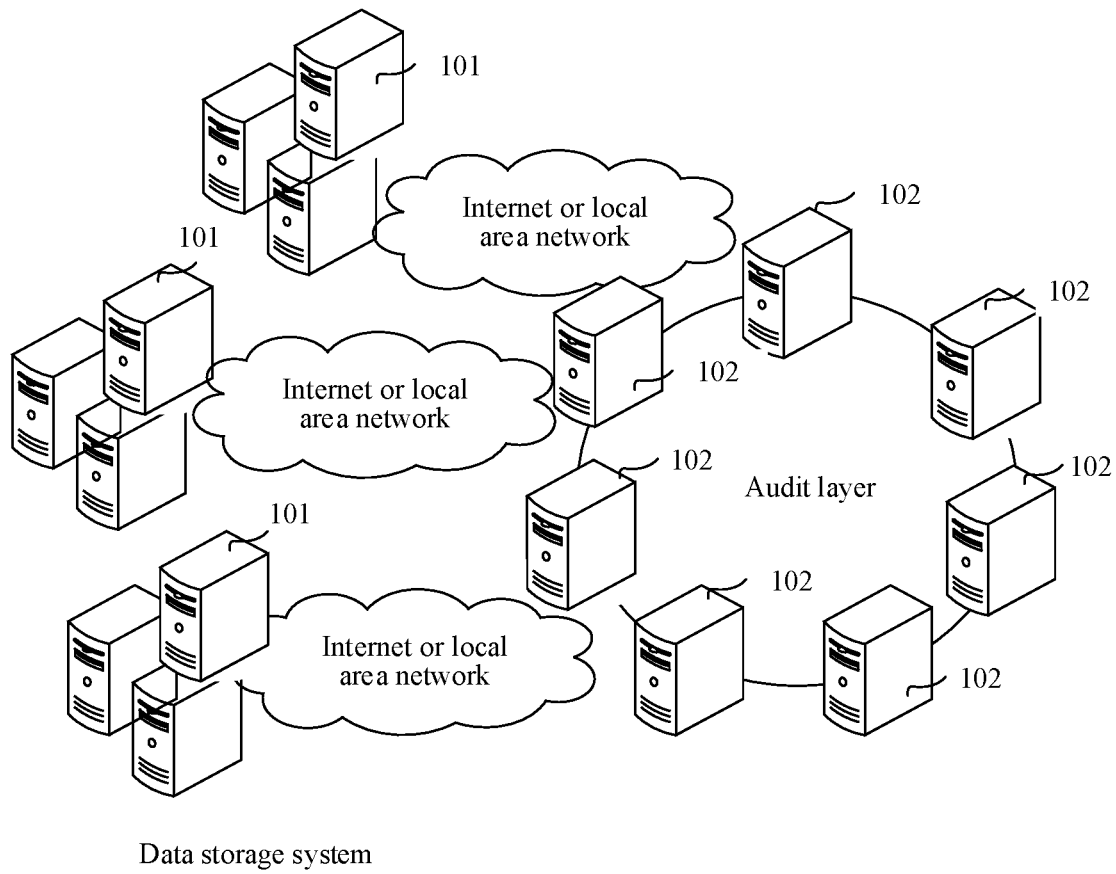
FIG. 1 is a schematic structural diagram of a data storage system according to an embodiment of this application.

FIG. 1 is a schematic structural diagram of a data storage system according to an embodiment of this application. The system includes a plurality of first nodes 101 and a plurality of second nodes 102.

Each of the plurality of first nodes is configured to: obtain first data of a target object; obtain second data of the target object, where the first data and the second data are data of different dimensions; store the first data and the second data of the target object in the first node, and obtain audit information of the first node, where the audit information is used for indicating the data stored in the first node; and broadcast the audit information of the first node to the plurality of second nodes in the data storage system.

Each of the plurality of second nodes is configured to: receive the audit information of the first node, where the audit information is used for indicating the data stored in the first node; verify the audit information based on target audit information of at least one target node; broadcast a verification success notification in the data storage system in a case that the verification succeeds; and determine that a consensus on the audit information is reached in a case that the received verification success notification meets a consensus success condition.

The plurality of first nodes 101 may be nodes of different operating entities, and may be configured to store data related to production and transactions of the corresponding operating entities. Each of the first nodes 101 may store its own data in a database or blocks. If the data is stored in a database, each piece of data is indexed and stored in corresponding storage space based on the index. If the data is stored in blocks, different pieces of the data stored in the first node are correlated to some extent, and a block form similar to that in a block chain may be adopted to ensure that the data is tamper-proof. The plurality of first nodes 101 may constitute a basic data layer of the data storage system, and may also provide a data query function for the corresponding operating entities respectively, so as to trace transactions with other nodes and their own production activities. Specifically, the plurality of first nodes 101 may communicate with each other to perform transactions. For example, a first node 1 may transact with a first node 2 to perform a process such as a transfer, product delivery, and information exchange from an account corresponding to the first node 1 to an account corresponding to the first node 2, thereby completing a transaction with the first node 2. Certainly, the transaction may be completed online. In the actual transaction process, related offline transportation may also be involved. This is not limited in this embodiment of this application. In addition, the first node may alternatively be a proxy node of the operating entity, and is used for performing online transactions, data storage, and the like on behalf of one or more operating entities. When acting as a proxy node of one or more operating entities, the first node may store data separately for each operating entity and ensure data privacy of each operating entity by setting a key or the like.

The plurality of second nodes 102 may be configured to verify the data generated by the plurality of first nodes during the production and transaction processes, and indicate authenticity of the data in the first nodes based on verification results. The same block chain may be deployed for the plurality of second nodes 102, that is, the plurality of second nodes 102 may follow the same consensus mechanism. Specifically, the plurality of second nodes 102 may verify the data of the first node 101 separately, and then verify the data by consensus based on the consensus mechanism and the verification results of the plurality of second nodes 102. If the verification results meet a consensus success condition (for example, over ⅔ of all the second nodes verify the data successfully), the plurality of second nodes 102 reach a consensus and determine that the data of the first node 101 is authentic. If the verification results do not meet the consensus success condition, the plurality of second nodes 102 fail to reach a consensus and determine that the data of the first node 101 is not authentic. A specific consensus mechanism adopted is not limited in this embodiment of this application.

The plurality of first nodes 101 constitute the basic data layer of the data storage system and are configured to store their own data, while the plurality of second nodes 102 constitute an audit layer of the data storage system and are configured to provide a verification service for the plurality of first nodes 101. The data of the first nodes 101 may be isolated to some extent. For example, transaction data of the first node 1 is invisible to the first node 2, and the first node 1 may transmit a transaction request that carries account information to a second node. The data of the first nodes 101 is transparent or relatively transparent to the plurality of second nodes 102, that is, the second nodes 102 may obtain the data stored in the first nodes 101 or an eigenvalue (for example, a hash value) of the data. In this embodiment of this application, a specific process of obtaining the data or the eigenvalue is detailed later.

The first node or the second node may be provided as any computer device.

Figure 2:
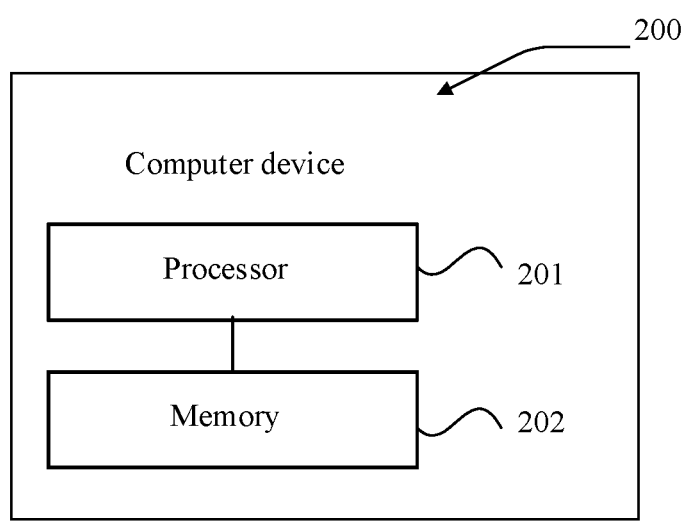
FIG. 2 is a schematic diagram of a computer device according to an embodiment of this application.

For example, FIG. 2 is a schematic diagram of a computer device according to an embodiment of this application. The computer device 200 may vary greatly according to configuration or performance, and may include one or more processors (central processing units, CPU) 201 and one or more memories 202. The memory 202 stores at least one instruction each, where the at least one instruction is loaded and executed by the processors 201 to implement the data storage method or the data verification method provided in the following embodiments. Certainly, the computer device may also have components such as a wired or wireless network interface, a keyboard, and an input/output interface for ease of input/output, and may further include other components for implementing functions of the device. Details are not provided herein.

Figure 3:
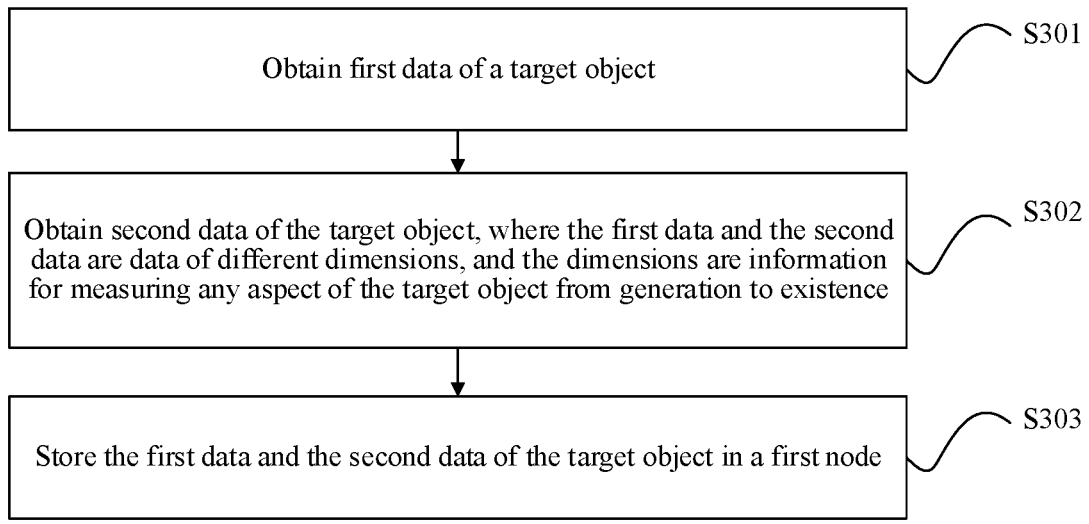
FIG. 3 is a flowchart of a data storage method according to an embodiment of this application.

FIG. 3 is a flowchart of a data storage method according to an embodiment of this application. The data storage method may be applied to any of the first nodes in FIG. 1. Referring to FIG. 3, the method includes the following steps:

S301: Obtain first data of a target object.

The target object may be any product that can be transacted or circulated offline or online. The target object may be a tangible product, which may be obtained based on manual production or machine production. For example, the tangible product may be food, a commodity, houseware, or a household appliance, which is not specifically limited in this embodiment of this application. The target object may alternatively be a bill product, that is, a product in a form of a bill. For example, the target object may be a financial product such as stock, bond, or fund share. Certainly, the target object may alternatively be a virtual product, that is, a product in a form of electronic data, which may correspond to an actual currency value or a virtual currency value. The currency value may not be fixed, but fluctuates according to market rules. For example, the virtual product may be a financial product, such as an online fund product or an online stock product.

The first data may be data of a dimension of the target object, where the dimension refers to information for measuring any aspect of the target object from generation to existence. For example, the dimension may be a time dimension, a transaction dimension, or an environmental protection dimension. The time dimension may include an existence duration of the target object, a remaining time of the target object till its extinction, or a remaining time of the target object till its settlement or expiration. The transaction dimension may include transaction parties, a transaction amount, a transaction time, and the like of transaction behavior correlated with the target object from generation to existence. The environmental protection dimension may include emission or production of a hazardous substance, such as carbon emission, formaldehyde production, or industrial waste production.

S302: Obtain second data of the target object, where the first data and the second data are data of different dimensions, and the dimensions are information for measuring any aspect of the target object from generation to existence.

The second data may refer to data of a dimension different from that of the first data. For example, if the first data is data of the time dimension, the second data may be data of the transaction dimension or the environmental protection dimension.

S303: Store the first data and the second data of the target object in the first node.

The first node may store data related to production or transactions of the node. The data may include information about any transaction occurring in a production or circulation phase of the target object corresponding to the node.

During data storage, the first node may correspondingly store the first data and the second data for ease of query. For example, the first node may store the first data and the second data in one data item or related data items in a database of the first node, store the first data and the second data in one block, or store the first data and the second data in different blocks and identify them with the same data identifier for ease of query.

In some embodiments, the first node may cross-compare obtained data of at least two dimensions before storing the data and then perform the storage step S303 if the obtained data of the at least two dimensions matches each other. Data of different dimensions may conform to a function relationship. Therefore, the data of the at least two dimensions may be cross-compared based on a function relationship between the dimensions. If the data matches each other, the data may be stored. If the data does not match each other, the storage step is not performed. For example, there may be a function relationship between a life cycle and carbon emission. For example, if the life cycle is reduced by two days, the carbon emission needs to be increased by 10 units. If the multi-dimensional data does not meet the function relationship, it indicates that the data is incorrect, and the data does not match each other.

The foregoing cross-comparison may be intended for data of any dimension provided in this embodiment of this application. That is, if the obtained data is the first data and the second data, the cross-comparison is performed based on the first data and the second data; if the obtained data is the first data, the second data, and third data, the cross-comparison is performed based on the first data, the second data, and the third data.

Similarly, if the obtained data further includes other data, the cross-comparison is performed in accordance with the foregoing principle. Certainly, the foregoing comparison is only a simple example of a specific comparison process. Other comparison processes may further be performed based on the multi-dimensional data, which is not limited in this embodiment of this application.

In this embodiment of this application, data of different dimensions of a target object is obtained, each phase of the target object from production to circulation and each link of the phases are recorded from a plurality of perspectives, so as to closely correlate online data with real production and life. In this way, the online data is granted practical significance, and is no longer merely a simple expression of some virtual currency. Further, in the embodiments of this application, data of a plurality of dimensions recorded by the first node corresponding to each phase is correlated with each other. Therefore, data in all phases and links may be verified with each other, and the data of the plurality of dimensions may also be verified with each other, so as to form a streaming seamless data chain. Data of each first node is stored in the node, thereby improving data security.

The target object may go through a plurality of phases from production to circulation, and the phases may be divided according to actual requirements. For example, food may go through a raw material production phase, a target object production phase, a transportation phase, a sales phase, and the like. The sales phase may further include different phases according to different sales modes. For example, if an e-commerce sales mode is used, the sales phase may include an e-commerce phase, a warehousing phase, a logistics phase, and a consumer phase. If a direct sales mode is used, the sales phase may include a launch phase and a consumer phase. In another example, any virtual product may go through a design phase, a trial run phase or a pre-sales phase, and a formal release phase.

Based on the embodiment shown in FIG. 3, in some embodiments, the first data of the target object includes a remaining life cycle of the target object in a current phase, and the second data of the target object includes transaction data of the target object in the current phase.

The life cycle refers to a period from an original state of a target object to generation of the target object and then to expiration, end of service life, or exhaustion of the target object. A life cycle of food may be expressed as a shelf-life. For example, a shelf-life of milk may be 30 days. A life cycle of a virtual product may be expressed as a validity period. For example, a validity period of a financial product may be 60 days. A validity period of a software product may be expressed as a validity period of permission for use. For example, a validity period of premium membership is one month. A life cycle of an electronic product may be expressed as an obsoleteness period or the number of times the electronic product is used. For example, a washing machine may become obsolete after five years or after being used 10,000 times. Based on the foregoing description of the life cycle, it can be learned that a remaining life cycle is a remainder of a life cycle of the target object at a current time point. For example, the life cycle of the foregoing food is 30 days. If the food has been circulated for 10 days, the remaining life cycle of the food is 20 days. Consumption may occur in all phases of the target object and may have impact on use or existence of the target object. To record such impact, the remaining life cycle of the target object may be obtained.

In some embodiments, each phase of the target object may have a corresponding remaining life cycle, or only some phases of the target object may have corresponding remaining life cycles. This may be determined specifically according to a feature of the target object. For example, a target object with raw materials already has a corresponding remaining life cycle in a production phase of the raw materials. In subsequent phases, the remaining life cycle decreases based on the remaining life cycle in the production phase of the raw materials. For a target object without raw materials, the concept of life cycle may not occur until a specific phase. This is not limited in this embodiment of this application. It can be learned from the foregoing description that if a phase corresponding to the first node is a start phase of a life cycle, a value of the remaining life cycle is equal to a length of the life cycle.

In some embodiments, the remaining life cycle may be expressed in any time granularity. A specific time granularity used may be set according to a type of the target object. In some embodiments, the remaining life cycle may further include the value of the remaining life cycle and a start time of the life cycle, so as to provide an intuitive time point to further express a sustainability or usability condition of the target object.

In some embodiments, the remaining life cycle of the target object in the current phase is a difference between a remaining life cycle in a previous phase and a time consumption of the current phase.

The process of obtaining the remaining life cycle of the target object in the current phase may include: obtaining the remaining life cycle in the previous phase and the time consumption of the current phase, and then obtaining the difference between the remaining life cycle in the previous phase and the time consumption of the current phase as the remaining life cycle in the current phase.

For the first nodes, before processing of the current phase is started, a remaining life cycle sent by a first node corresponding to the previous phase of the target object may be obtained. The remaining life cycle may be obtained when a transaction with the first node corresponding to the previous phase is completed, and is transmitted by the first node corresponding to the previous phase to a first node corresponding to the current phase. When transmitting the remaining life cycle, the first node corresponding to the previous phase may further transmit signature data, which is obtained by signing the remaining life cycle with a private key, and a public key of the first node corresponding to the previous phase.

In some embodiments, the time consumption of the current phase may be set according to a feature of the current phase. The phases may be correlated with links of different investment or expenditure activities, such as human resources, production, packaging, transportation, electric power supply, and water supply. The links may correspond to different time consumptions. Therefore, different phases may consume different periods of time, and time consumptions of links correlated with each phase need to be analyzed so as to determine a time consumption of the phase. Certainly, in some embodiments, the time consumption of each phase may be set according to experience or analysis on historical processing time of the phase. Certainly, the time consumption of each phase may also be set according to analysis on historical processing time of each link correlated with the phase, so as to calculate a remaining life cycle more accurately. In some embodiments, the time consumption of each phase may also be counted in real time to obtain a more authentic remaining life cycle based on real data.

In some embodiments, the transaction data of the target object in the current phase includes transaction data of the target object in each link of the current phase, and further includes signature data of the transaction data of the target object in each link of the current phase. The first node records transaction information about transactions occurring in all the links of the current phase, for example, an expense EX transferred from an account 1 of the first node to an account 2 of the node that undertakes transportation in the transportation link, and also obtains signature data provided by a counterparty in each link after the counterparty accepts the transaction. The signature data may be obtained by a first node of the counterparty by signing the transaction information with a private key. For example, the signature data may be Sig_(EX(account 1 to account 2)). Optionally, the counterparty may also return its public key together with the signature data, for ease of verification on the counterparty and the signature data.

In some embodiments, the first data of the target object includes a resource consumption surplus of the target object in the current phase, and the second data of the target object includes transaction data of the target object in the current phase.

Resource consumption may occur in all the phases of the target object and have impact on an environment. To limit such impact, such data needs to be recorded.

Resource consumption refers to consumption of resources in a period from an original state of a target object to generation of the target object and then to expiration, end of service life, or exhaustion of the target object. For example, for an industrial product, such impact may be expressed as an emission amount of an incidental substance resulting from consumption of resources by industrial production activities, such as an emission amount of carbon or formaldehyde.

In some embodiments, the resource consumption surplus of the target object in the current phase is a difference between a resource consumption surplus of a previous phase and a resource consumption amount of the current phase.

The process of obtaining the resource consumption surplus of the target object in the current phase may include: obtaining the resource consumption surplus of a previous phase and the resource consumption amount of the current phase, and then obtaining the difference between the resource consumption surplus of the previous phase and the resource consumption amount of the current phase as the resource consumption surplus in the current phase.

For the first nodes, before processing of the current phase is started, a resource consumption surplus transmitted by a first node corresponding to the previous phase of the target object may be obtained. The resource consumption surplus may be obtained when a transaction with the first node corresponding to the previous phase is completed, and may be transmitted by the first node corresponding to the previous phase to a first node corresponding to the current phase. When transmitting the resource consumption surplus, the first node corresponding to the previous phase may further transmit signature data, which is obtained by signing the resource consumption surplus with a private key, and a public key of the first node corresponding to the previous phase.

In some embodiments, the resource consumption amount of the current phase is a sum of resource consumption amounts of the target object in all links of the current phase. The first node records information about transactions occurring in all links of the current phase and the resource consumption amounts obtained based on the transactions, for example, an expense EX transferred from an account 1 of the first node to an account 2 of the node that undertakes transportation in the transportation link, and also obtains a carbon emission amount CC provided by a counterparty in each link based on the transaction. Correspondingly, the obtained signature data may be obtained by signing based on the transaction information and the resource consumption amount.

The foregoing resource consumption surplus may be a resource consumption surplus normalized to a single target object. For example, a carbon emission surplus may be a carbon emission surplus normalized to a single product. For any type of target object, a resource consumption indicator may be set to guide actual generation. For example, a carbon emission indicator may be set based on an upper limit of carbon emission specified in an international conference.

In some embodiments, the method further includes: obtaining, by the first node, third data of the target object, where the third data is correlated with the second data; and storing the third data of the target object in the first node while storing the first data and the second data of the target object in the first node.

A dimension of the third data may be different from those of the first data and the second data. Generation of the third data may be correlated with generation of the second data. The second data may be the transaction data of the target object in the current phase and may be generated based on an investment or expenditure behavior in the generation or circulation process of the target object. The third data is also generated based on the investment or expenditure behavior in the generation or circulation process of the target object. With the generation of the second data, the corresponding third data may be generated.

The second data does not necessarily have correlated third data, while the third data is definitely generated due to the generation of the second data. For example, when any expenditure behavior occurs, both transaction parties conduct a capital transaction and complete a transaction in a corresponding resource consumption dimension (for example, a carbon emission amount of the seller is transferred to the buyer as a result of the transaction).

During data storage, the first node may store the first data, the second data, and the third data in one block, or store the first data, the second data, and the third data in different blocks and identify them with the same data identifier for ease of query. Certainly, the second data and the third data may be stored in one block while the first data may be stored in another block, and the first data, the second data and the third data may be identified with the same data identifier. This is not limited in this embodiment of this application.

In some embodiments, the third data of the target object includes the resource consumption surplus of the target object in the current phase. For example, the first data may be the remaining life cycle of the current phase, the second data may be the transaction data of the current phase, and the third data may be the resource consumption surplus of the target object in the current phase, where the resource consumption surplus is a carbon emission surplus.

In some embodiments, the first node may further obtain audit information of the first node, where the audit information is used for indicating the data stored in the first node, and may broadcast the audit information of the first node to the plurality of second nodes in the data storage system.

For the first node, the foregoing step of obtaining the audit information of the first node may be performed before the storage of the first data and the second data, that is, after steps S301 and S302 are performed, the foregoing step of obtaining and broadcasting the audit information may be performed. Therefore, when a consensus acknowledgment notification is received, the step of storing the first data and the second data of the target object in the first node may be performed.

In some embodiments, the first node may also have a resource pool for temporarily storing data. That is, when the first data and the second data are obtained, they may be first stored in the resource pool of the first node. When a consensus acknowledgment notification transmitted by any second node is received, the first data and the second data stored in the resource pool are then stored in a preset storage space of the first node.

In some embodiments, the audit information includes the data stored in the first node; or the audit information includes data stored in the first node within a preset period of time. In this implementation, the audit information may be the data stored in the first node instead of an eigenvalue, so that the second node may obtain original transaction data, thereby greatly improving verification accuracy of the second node.

In some embodiments, the audit information includes an eigenvalue of the data stored in the first node; or the audit information includes an eigenvalue of data stored in the first node within a preset period of time. The data stored in the preset period of time may be data obtained by the first node in at least one production process instead of data obtained in only one production process, so as to prevent excessively frequent data transmission caused by a relatively large production scale or relatively high production frequency.

The eigenvalue may be a hash value or any eigenvalue calculated based on an irreversible algorithm.

In some embodiments, the audit information is signature data obtained by the first node by signing the data stored in the first node with a private key of the first node. The signature informs the second node of a source node of the audit information. In some embodiments, the audit information further includes a public key of the first node. The second node may perform verification based on the public key and the signature data to determine that the audit information comes from the first node, and may perform a specific verification process based on the eigenvalue or other data obtained after decompressing the signature data.

In some embodiments, the audit information further includes context signature data obtained by the first node by signing context information of the current phase with a private key, where the context information includes at least one of a timestamp, geographic address information, and network address information. The context information may provide information such as an occurrence time point and an occurrence environment corresponding to the data to be audited, thereby ensuring traceability of the data.

Figure 4:
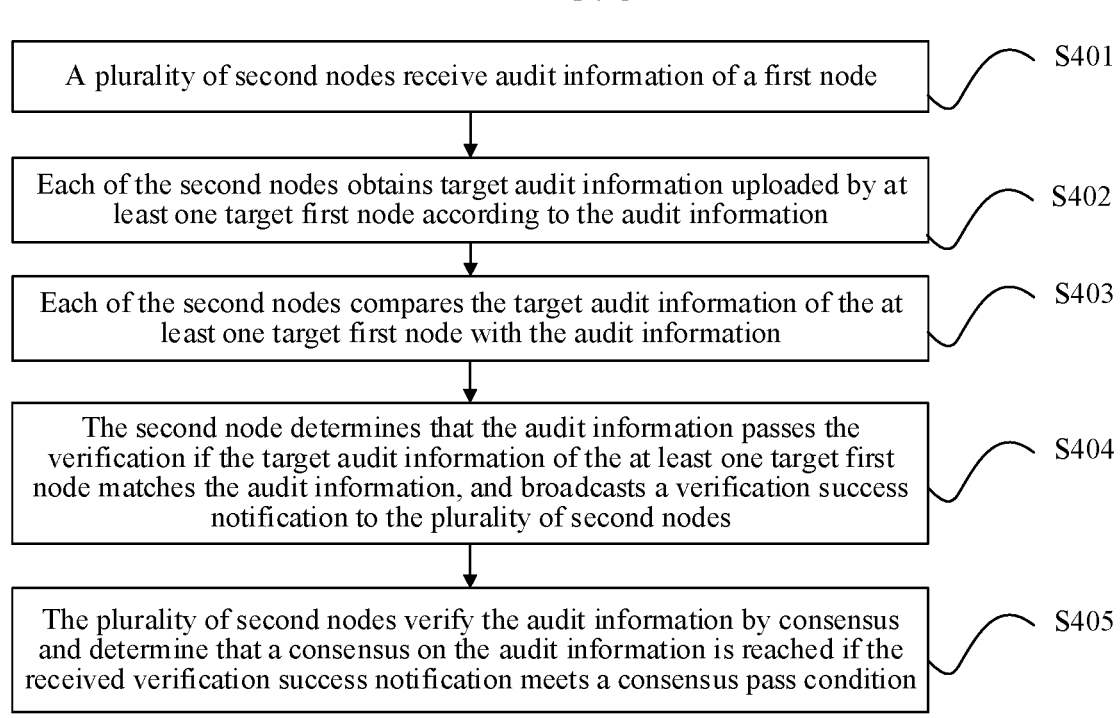
FIG. 4 is a flowchart of a data verification method according to an embodiment of this application.
Figure 5:
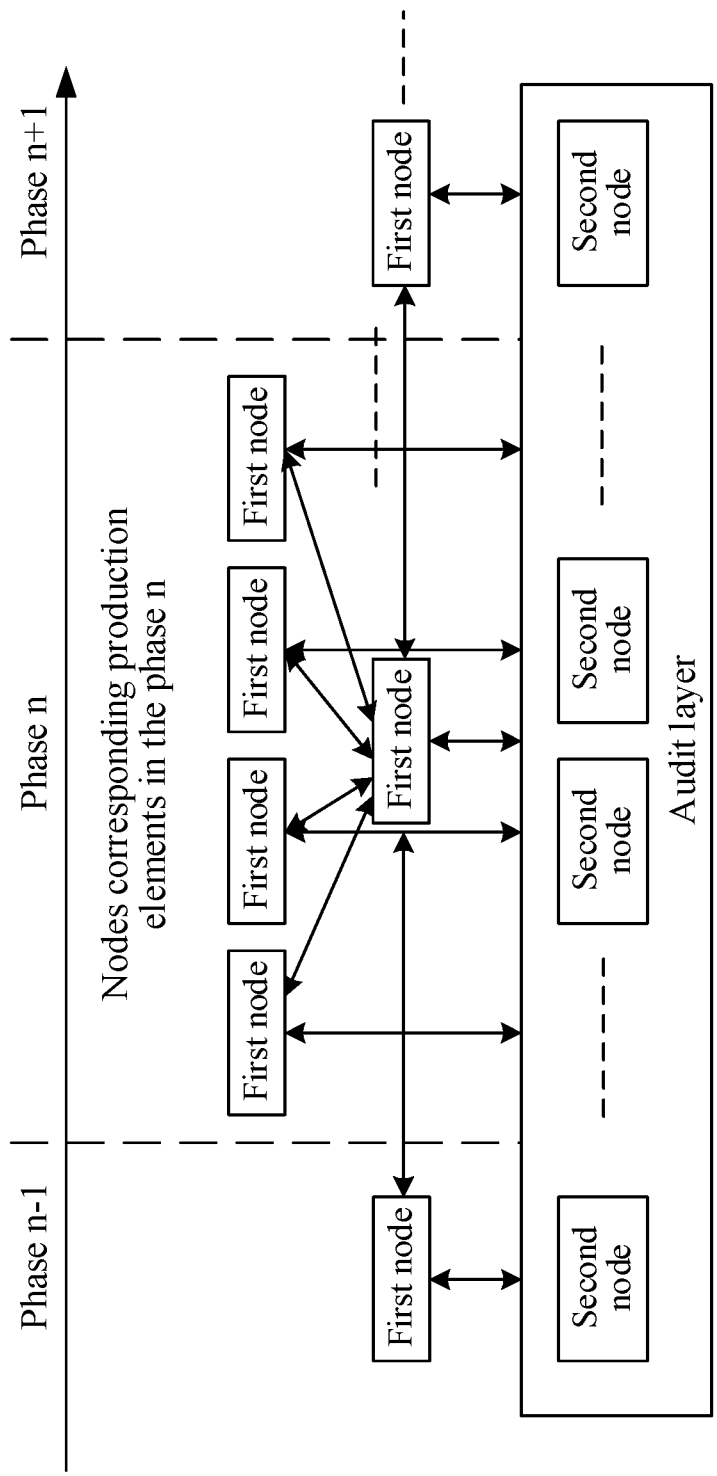
FIG. 5 is a schematic diagram of a data correlation network in a data verification process according to an embodiment of this application.

For the second nodes at the audit layer, data interactions shown in FIG. 4 and FIG. 5 may occur. FIG. 4 is a flowchart of a data verification method according to an embodiment of this application; FIG. 5 is a schematic diagram of a data correlation network in a data verification process according to an embodiment of this application. As shown in FIG. 4, the data verification method includes the following steps: S401: A plurality of second nodes receive audit information of a first node. S402: Each of the second nodes obtains, based on the audit information, target audit information uploaded by at least one target node. S403: Each of the second nodes compares the target audit information of the at least one target node with the audit information. S404: The second node determines that the audit information passes the verification if the target audit information of the at least one target node matches the audit information, and broadcasts a verification success notification to the plurality of second nodes. S405: The plurality of second nodes verify the audit information by consensus and determine that a consensus on the audit information is reached if the received verification success notification meets a consensus success condition.

Referring to FIG. 4 and FIG. 5, the second node receives the audit information of the first node, where the audit information is used for indicating data stored in the first node; verifies the audit information based on the target audit information of the at least one target node; broadcasts the verification success notification in the data storage system if the audit information passes the verification; and determines that a consensus on the audit information is reached if the received verification success notification meets the consensus success condition. When a consensus on the audit information is reached, the second node may further transmit a consensus acknowledgment notification to the first node.

The foregoing stored data may be first data and second data, or first data, second data, and third data, or second data and third data. Certainly, according to different data requirements, the stored data may also be a combination of first data and third data, which is not limited in this embodiment of this application.

The first nodes include the target first node, and the target first node is one of the plurality of first nodes. The target first node may refer to one or more nodes correlated with a current production activity of the first node. For example, the target first node may be an upstream node of the first node in a production or circulation process of a target object, or the target first node may be a node (for example, a first node corresponding to a company that provides a transportation service for the first node) that participates in a production link (that is, a production element) of the first node. Therefore, the target audit information corresponding to the target node is used for indicating data stored by each target first node that transacts with the first node.

In the embodiments of this application, the audit layer provides a verification function for each first node in the data storage system. Because the plurality of second nodes in the audit layer may obtain audit information of each first node, authenticity and accuracy of to-be-stored data may be determined by cross-comparing the audit information, thereby ensuring authenticity and accuracy of the data while ensuring security of the data.

In some embodiments, the second node may perform cross-comparison according to multi-dimensional data in the audit information provided by the first node. If the multi-dimensional data conforms to a preset function relationship, the second node determines that the audit information passes the verification. Therefore, the at least one target node may alternatively be the first node, and the target audit information of the at least one target node may alternatively be the audit information of the first node.

In some embodiments, that the second node verifies the audit information based on the target audit information of the at least one target node includes: obtaining, by the second node according to the audit information, the target audit information uploaded by the at least one target node, where the target audit information may refer to audit information uploaded by each target first node after performing a transaction with the first node; comparing, by the second node, the target audit information of the at least one target node with the audit information, and determining that the audit information passes the verification if the target audit information of the at least one target node matches the audit information.

The obtaining, by the second node according to the audit information, the target audit information uploaded by the at least one target node includes: obtaining, by the second node, a public key in at least one piece of signature data in the audit information; using, by the second node, a first node corresponding to the obtained public key as the at least one target node; obtaining, according to the public key, audit information that includes the first node corresponding to the public key and using the audit information as the target audit information of the at least one target node.

In a process comparing the target audit information of the at least one target node with the audit information of the first node by the second node, in some embodiments, the target audit information and the audit information are signatures of data eigenvalues instead of original data stored in the node.

In this case, the comparison process may include: first, decompressing the signatures based on a public key of each node to obtain a target eigenvalue of the at least one target node and an eigenvalue of the first node; then, determining whether the eigenvalue of the first node includes the target eigenvalue of the at least one target node; if the eigenvalue of the first node includes the target eigenvalue of the at least one target node, which indicates that transactions correspond to each other in a one-to-one manner and transaction contents also correspond to each other in a one-to-one to manner, determining that the target audit information of the at least one target node matches the audit information; and determining that the audit information passes the verification if the target audit information of the at least one target node matches the audit information.

In some embodiments, the audit information may be data stored in the first node with a signature, and the second node may cross-compare multi-dimensional data in audit information provided by different nodes. If the multi-dimensional data conforms to a preset function relationship, the second node determines that the target audit information of the at least one target node matches the audit information, and determines that the audit information passes the verification if the target audit information of the at least one target node matches the audit information.

In some embodiments, the at least one target node is a counterparty of a transaction indicated by the audit information.

In some embodiments, the at least one target node includes a node corresponding to each production element of the current phase and a node corresponding to the target object in a previous phase of the current phase.

In some embodiments, the method further includes: providing, by the first node, a barcode on a product produced in any phase, where an address to which the barcode is directed is used for providing at least one of latest first data of the target object and latest third data of the target object. The barcode may be in a form of a one-dimensional code, a two-dimensional code, or the like. The barcode may be directed to an address of a network resource, and data stored in the address may be updated according to first data of the current phase of the target object, so that at least one of the latest first data of the target object, the second data of the first node, and the latest third data of the first node may be obtained by scanning the code each time, thereby forming a pointer to data in the data storage system by using the barcode and correlating a real product with online data corresponding to the product. If the barcode is user-oriented, the second data related to transaction privacy may not be provided; if the barcode is audit-oriented, the second data of the target object may further be provided in the address to which the barcode is directed. For example, transaction data of a first node in a raw milk production phase may be provided, and specific data to be provided may be set according to actual requirements. This is not limited in this embodiment of this application.

The data stored in the address may be updated by the first node. Using update of the first data as an example, when any first node completes a transaction, first data may be updated to the address. Certainly, contents included in the address may include an update timestamp, and the first node may compare the update timestamp with a timestamp of to-be-uploaded first data. If the timestamp of the to-be-uploaded first data is later than the update timestamp, the first data is uploaded to overwrite first data that already exists in the address. If the timestamp of the to-be-uploaded first data is not later than the update timestamp, the first data is not uploaded. Alternatively, the data stored in the address may be updated by the second node. Specifically, the second node receives audit information of the first node, and uploads the audit information after a consensus is reached, to ensure that the first data stored in the address is authentic and reliable.

The address of the network resource may be in a form of a uniform resource identifier (URI).

For example, if the first data is a remaining life cycle during production of a dairy product, a two-dimensional code may be printed or pasted on a package of raw milk upon delivery. The two-dimensional code is generated based on a target URI. After a user scans the code by using a terminal, the user is redirected to the target URI and sees that a remaining life cycle of the raw milk is 15 days. Alternatively, if the target URI is used for storing a carbon emission surplus, the user may further view a carbon emission surplus of the raw milk through the target URI.

Certainly, the barcode may further provide network addresses of the plurality of second nodes. The terminal may transmit data obtained through scanning to the plurality of second nodes for verification. If the data passes the verification, a verification success notification may be returned, so that the user can learn that the data is authentic and accurate, and it can be ensured that the transactions are authentic and reliable.

In the implementation of this application, analysis may be performed according to different phases related to different target objects. Production elements of each phase may be broken down to form a data chain diagram, and corresponding resource consumption indicators may be set for each phase. In addition, a time consumption, a transaction amount, and a resource consumption amount may be determined for each phase according to a feature of each production element. Streaming expressions are used for the three types of data in each phase, following real correlations between the data in economic life. For example, an Unspent Carbon Transaction Output (UCXO), which means a carbon emission surplus, is correlated with an Unspent Transaction Output (UTXO) and an Unspent Life Cycle Output (UCLO), which means a remaining life cycle, to some extent. Life cycle consumption and value consumption inevitably lead to equivalent resource consumption, and UCLO is correlated with UCXO and UTXO to some extent. Resource consumption and value consumption are also inevitably equivalent to life cycle consumption. This potential connection makes data closely connected, forming a seamless data chain across the first nodes. Therefore, the data cannot be tampered with and has an actual data value.

Further, the basic data layer formed by the first nodes is correlated with each production element to form a seamless data link layer. In addition, the basic data layer is correlated with the audit layer to form a dual-layer data link structure. This ensures authenticity of data and tamper resistance of the data, thereby greatly improving security of the data.

Figure 6:
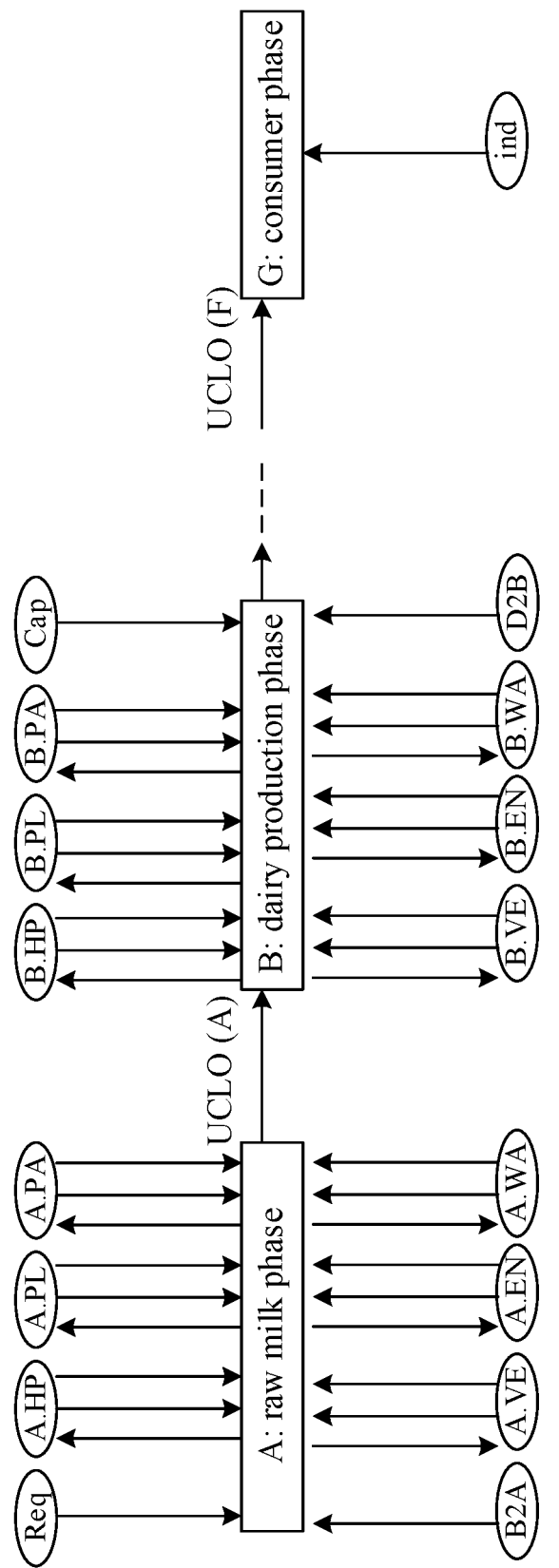
FIG. 6 is a schematic diagram of different phases of a dairy product from production to circulation and an implementation process involved in different links in each phase according to an embodiment of this application.

Referring to FIG. 6, an implementation process of different phases of a dairy product from production to circulation and different links of each of the phases is used as an example for description, where the related resource consumption is carbon emission.

First of all, some terms appearing in the subsequent detailed descriptions are introduced as follows:
CC: Carbon Cost, which means the amount of used carbon emission
ULCO: Unspent Life Cycle Output, which means a remaining life cycle
EX: expense Then, the phases of the dairy product are introduced. An entire process of the dairy product may include the following phases: raw milk (A), dairy production (B), transportation (C), e-commerce (D), warehousing (E), logistics (F), and consumer (G). Based on the foregoing process from production to circulation, after being produced, the raw milk may be transported and enter the dairy production phase. After the dairy production is completed, the dairy product may enter the e-commerce phase. After being released in the e-commerce phase, the dairy product may enter the warehousing phase. When being ordered, the dairy product may enter the logistics phase. After the logistics phase is completed, the dairy product may enter the consumer phase.

In the raw milk phase A, it is assumed that production elements corresponding to different links involved may include: A.HP human resources, A.PL production line, A.PA packaging plant, A.VE transportation vehicle, A.EN electric power plant, and A.WA water plant. A node corresponding to an operating entity in the raw milk phase is represented by a first node A, and a first node in the dairy production phase is represented by a first node B. There may be the following processes:

1. The first node A pays expenses of EX(A.HP), EX(A.PL), EX(A.PA), EX(A.VE), EX(A.EN), and EX(A.WA) respectively to production elements in each link of the raw milk production phase. After the transactions are completed, the first node A obtains the following signature data and stores the data in the first node A:
Hash signatures Sig_EX(HP2A) and Sig_CC(HP2A) indicating that HP accepts A's transaction, and a public key Pubkey(HP) of HP;
Hash signatures Sig_EX(PL2A) and Sig_CC(PL2A) indicating that PL accepts A's transaction, and a public key Pubkey(PL) of PL;
Hash signatures Sig_EX(PA2A) and Sig_CC(PA2A) indicating that PA accepts A's transaction, and a public key Pubkey(PA) of PA;
Hash signatures Sig_EX(VE2A) and Sig_CC(VE2A) indicating that VE accepts A's transaction, and a public key Pubkey(VE) of VE;
Hash signatures Sig_EX(EN2A) and Sig_CC(EN2A) indicating that EN accepts A's transaction, and a public key Pubkey(EN) of EN; and
Hash signatures Sig_EX(WA2A) and Sig_CC(WA2A) indicating that WA accepts A's transaction, and a public key Pubkey(WA) of WA.

Pubkey( ) refers to a public key of a node, Sig_EX(itoj) refers to signature data of EX paid by a node i to a node j, and Sig_CC(itoj) refers to signature data of CC transferred from the node i to the node j. The foregoing signature data indicates that when performing a capital transaction, the node A also completes a corresponding carbon emission transaction.

2. The first node A obtains a carbon emission surplus of the raw milk phase according to a carbon emission indicator and the amount of carbon emission used in the current phase, and stores the carbon emission surplus in the first node A.

The carbon emission surplus may be specifically calculated using the following formula:

$$UCXO(A)=UCXO(\text{Req})-CC(A.HP)-CC(A.PL)-CC(A.PA)-CC(A.VE)-CC(A.EN)-CC(A.WA)$$

UCXO(A) is the carbon emission surplus in the raw milk phase and UCXO(Req) is a carbon emission surplus indicator of the entire process. This indicator, for example, may be broken down into a carbon emission quota of each economic link based on a total amount of carbon emission determined by an international conference or an industry standard. CC(A.HP) is the amount of carbon emission used for the human resources in the phase A and has a value equal to that of CC(HP2A). CC(A.PL) is the amount of carbon emission used for the production line in the phase A and has a value equal to that of CC(PL2A). CC(A.PA) is the amount of carbon emission used for the packaging plant in the phase A and has a value equal to that of CC(PA2A). CC(A.VE) is the amount of carbon emission used for the transportation vehicle in the phase A and has a value equal to that of CC(VE2A). CC(A.EN) is the amount of carbon emission used for the electric power plant in the phase A and has a value equal to that of CC(EN2A). CC(A.WA) is the amount of carbon emission used for the water plant in the phase A and has a value equal to that of CC(WA2A).

Optionally, UCXO(A) may be a carbon emission margin normalized to a single product.

3. The first node A transacts with the first node B and a manufacturer B pays EX(B2A) to a raw milk supplier A for raw milk. After the transaction is completed, the first node A may transmit the outputted remaining life cycle ULCO(A) of the raw milk to the first node B, obtain the following signature data, and store the data in the first node A:

Hash signatures Sig_ULCO(A2B), Sig_EX(BtoA), and Sig_CC(BtoA), indicating that B accepts A's raw milk, and public key Pubkey(B) of B Sig_ULCO(itoj) is signature data obtained after the node j signs ULCO of a target object provided by the node i to the node j.

In any of the foregoing processes 1, 2, and 3, the first node A may cross-compare obtained data of at least two dimensions and then store the obtained data of the at least two dimensions if the data matches.

4. The first node A obtains audit information of the first node A and broadcasts the audit information to the plurality of second nodes in the data storage system.

Specifically, the first node A generates a hash value of the stored data based on the stored data, and then signs the hash value based on a private key of the first node A to obtain signature data. The data includes an expenditure and a carbon emission surplus for each production element in each link of a phase corresponding to the first node A. For example, the audit information may include the following content:

Sig((Sig_EX(HP2A), Sig_CC(HP2A), Pubkey(HP),
Sig_EX(PL2A), Sig_CC(PL2A), Pubkey(PL),
Sig_EX(PA2A), Sig_CC(PA2A), Pubkey(PA),
Sig_EX(VE2A), Sig_CC(VE2A), Pubkey(VE),
Sig_EX(EN2A), Sig_CC(EN2A), Pubkey(EN),
Sig_EX(WA2A), Sig_CC(WA2A), Pubkey(WA),
Sig_ULCO(A2B), Pubkey(B))

Optionally, in addition to the foregoing contents, the audit information may further include a public key Pubkey(A) of the first node A or context signature data obtained by the first node A by signing context information of the current phase with a private key, where the context information includes at least one of a timestamp, geographic address information, and network address information. The context signature data may be expressed as Sig(loc, timestamp, ip), where loc represents the geographic address information, timestamp represents the timestamp, and ip represents the network address information.

In this example, the audit information including signature data is used as an example for description, and the signature data is obtained by signing stored signature data of the first node A based on the private key of the first node A. In another embodiment, the audit information may further include the stored data of the first node A, that is, transaction information of the first node A in each link, so that the plurality of second nodes verify the audit information more intuitively by using original data of actual transactions.

5. After receiving the audit information, the plurality of second nodes verify the audit information by consensus. If a consensus is reached, the plurality of second nodes determine that the data stored by the first node A this time is authentic and accurate.

The process of reaching a consensus may refer to that each of the second nodes obtains, based on the public key of each production element carried in the audit information, target audit information transmitted after the production element successfully transacts with the first node A, and verifies the audit information of the first node based on the target audit information of each production element. If the audit information is consistent, the audit information of the first node A passes the verification performed by the second node, and the second node broadcasts a verification success notification to other second nodes. If the verification success notification received by any second node meets a consensus success condition, it is determined that a consensus is reached.

In some embodiments, the foregoing process of verifying the audit information of the first node based on the audit information of each production element may include: obtaining, according to the audit information, target audit information uploaded by at least one target node, where the target audit information refers to audit information uploaded by each target first node after performing a transaction with the first node; comparing the target audit information of the at least one target node with the audit information, and determining that the audit information passes the verification if the target audit information of the at least one target node is consistent with the audit information. The obtaining, according to the audit information, target audit information uploaded by at least one target node includes: obtaining a public key in at least one piece of signature data in the audit information; using a first node corresponding to the obtained public key as the at least one target node; obtaining, according to the public key of the first node, audit information that includes the public key of the first node from the audit information of the at least one target node and using the obtained audit information as the target audit information of the at least one target node.

A transaction between the first node A and a first node PL corresponding to the production element PL is used as an example. The audit information of the first node A includes Sig_EX(PL2A) and Sig_CC(PL2A). If the transaction is real and accurate, the audit information of the first node PL includes Sig_EX(PL2A) and Sig_CC(PL2A). If the audit information is consistent after comparison, the transaction is real and transaction contents are accurate. If audit information between the first node A and all the production elements is consistent after similar comparison, the second node may determine that the audit information passes the verification. In this example, comparison is only performed on audit information of one production element. Actually, the second node may verify the audit information according to audit information uploaded by each production element and an upstream first node. A specific process is the same as that in the foregoing example, and details are not provided herein.

6. After receiving the audit information, the plurality of second nodes verify the audit information by consensus. If a consensus is not reached, the plurality of second nodes determine that the data stored by the first node A this time is problematic.

Specifically, if a consensus is not reached, the data stored in the first node A is not consistent with authentic data, indicating that the data stored in the first node A may be faked. Therefore, the second node may record a data distortion event of the first node A for subsequent processing. If a quantity of data distortion events meets a condition, an operating entity corresponding to the first node may be marked as a discredited operating entity, or other processing may be performed for punishment and public announcement purposes. A specific manner adopted is not limited in this application.

Each of the first nodes records information related to transactions performed by the node, such as transaction parties, transaction amounts, transaction locations, and transaction time points. Details are not provided in this embodiment of this application.

In the production phase B, it is assumed that production elements corresponding to different links involved may include: B.HP human resources, B.PL production line, B.PA packaging plant, B.VE transportation vehicle, B.EN electric power plant, and B.WA water plant. A first node in the dairy production phase is represented by the first node B. There may be the following processes:

1. The first node B transacts with the first node A and obtains a remaining life cycle ULCO(B) of the dairy product. For example, the dairy product expires after six months and an obtained carbon emission surplus is UCXO(A).

2. The first node B pays EX(B.HP), EX(B.PL), EX(B.PA), EX(B.VE), EX(B.EN), and EX(B.WA) respectively to production elements in each link of the raw milk production. After the transactions are completed, the first node B obtains the following signature data and stores the data in the first node B:

Hash signatures Sig_EX(HP2B) and Sig_CC(HP2B) indicating that HP accepts B's transaction, and a public key Pubkey(HP) of HP;

Hash signatures Sig_EX(PL2B) and Sig_CC(PL2B) indicating that PL accepts B's transaction, and a public key Pubkey(PL) of PL;

Hash signatures Sig_EX(PA2B) and Sig_CC(PA2B) indicating that PA accepts B's transaction, and a public key Pubkey(PA) of PA;

Hash signatures Sig_EX(VE2B) and Sig_CC(VE2B) indicating that VE accepts B's transaction, and public key Pubkey(VE) of VE;

Hash signatures Sig_EX(EN2B) and Sig_CC(EN2B) indicating that EN accepts B's transaction, and public key Pubkey(EN) of EN;

Hash signatures Sig_EX(WA2B) and Sig_CC(WA2B) indicating that WA accepts B's transaction, and public key Pubkey(WA) of WA.

After the transactions are completed, a carbon emission surplus in this phase may further be calculated using the following formula: UCXO(B)=UCXO(A)−CC(B.HP)−CC(B.PL)−CC(B.PA)−CC(B.VE)−CC(B.EN)−CC(B.WA).

CC(B.HP) is the amount of carbon emission used for the human resources in the phase B, CC(B.PL) is the amount of carbon emission used for the production line in the phase B, CC(B.PA) is the amount of carbon emission used for the packaging plant in the phase B, CC(B.VE) is the amount of carbon emission used for the transportation vehicle in the phase B, CC(B.EN) is the amount of carbon emission used for the electric power plant in the phase B, and CC(B.WA) is the amount of carbon emission used for the water plant in the phase B. Numerical relationships between the foregoing amounts of used carbon emission are the same as those of the raw milk phase. Details are not provided herein. Optionally, UCXO(B) may be a carbon emission surplus normalized to a single product.

An unspent capital output in the dairy production phase is calculated using the following formula: UTXO(B)=UTXO(Cap)−ex(B.HP)−ex(B.PL)−ex(B.PA)−ex(B.VE)−ex(B.EN)−ex(B.WA).

UTXO(Cap) is an unspent transaction output of the dairy production plant, which, for example, may correspond to an investment in the dairy production plant.

3. The first node B transacts with a first node C and outputs ULCO(B) to the first node C, so that after the production is completed, the B.VE transportation vehicle is used to complete the transportation. Accordingly, the first node B records the following information:

Hash signatures Sig_ULCO(B2C), Sig_EX(BtoC), and Sig_CC(BtoC) indicating that C accepts B's dairy product, and a public key Pubkey(C) of C.

The first node B may transact with the first node C at any moment prior to the transportation. An e-commerce company C pays EX(D2B) to the manufacturer B for the dairy product. Then, the first node B stores information related to the transaction.

4. The first node B obtains audit information of the first node B and broadcasts the audit information to the plurality of second nodes in the data storage system. For example, the audit information may include the following content:

Sig((Sig_EX(HP2B), Sig_CC(HP2B), Pubkey(HP), Sig_EX(PL2B), Sig_CC(PL2B), Pubkey(PL), Sig_EX(PA2B), Sig_CC(PA2B), Pubkey(PA), Sig_EX(VE2B), Sig_CC(VE2B), Pubkey(VE), Sig_EX(EN2B), Sig_CC(EN2B), Pubkey(EN), Sig_EX(WA2B), Sig_CC(WA2B), Pubkey(WA), Sig_ULCO(B2C), Pubkey(C))

Optionally, other information included in the audit information is similar to that in the previous phase and is not described herein. Similarly, all phases of the dairy product may have the same bookkeeping process as described above. Details are not provided herein.

ULCO(F) is a remaining life cycle of the dairy product when it arrives at the consumer through the logistics process F.

The dairy product further includes a final phase, that is, the consumer phase G. The consumer phase G may also have a rated indicator UCXO(Ind) for individual carbon emission surplus, which, for example, may be a quota allocated to each individual based on G20's overall indicator for global carbon emission. Further, a two-dimensional code or the like may be marked on the package of the dairy product in this embodiment of this application. In the consumer phase G, a consumer may obtain UCLO(F), that is, a remaining validity period, of the dairy product by scanning the code, and compare UCLO(F) with a shelf-life of the dairy product to determine whether the dairy product expires. Certainly, based on different data stored in the address corresponding to the two-dimensional code, the consumer may also obtain UCXO(F) corresponding to the consumer phase G, that is, a carbon emission surplus UCXO of the dairy product. When the consumer buys products with different carbon emission surpluses, a UCXO of the consumer is affected. In this phase, UCXO(Ind) may be compared with UCXO(F) to determine whether the consumer's carbon consumption exceeds a limit, so as to adjust a rated indicator for the consumer's carbon consumption surplus based on the result. For example, if the consumer's carbon consumption does not exceed the limit within a preset period of time, the rated indicator for the consumer's carbon consumption surplus may be increased as a reward.

For example, the consumer's carbon emission surplus is UCXO(ind)+(UCXO(G)−UCXO(ave)), where UCXO(ave) is a preset average surplus. If a product consumed by the consumer has a carbon emission surplus higher than an industry average, the consumer's carbon emission surplus is increased; if the product consumed by the consumer has a carbon emission surplus lower than the industry average, the consumer's carbon emission surplus is reduced.

Certainly, the consumer phase G also involves data storage. Specific principles are the same as those of the foregoing process, and details are not provided herein.

Figure 7:
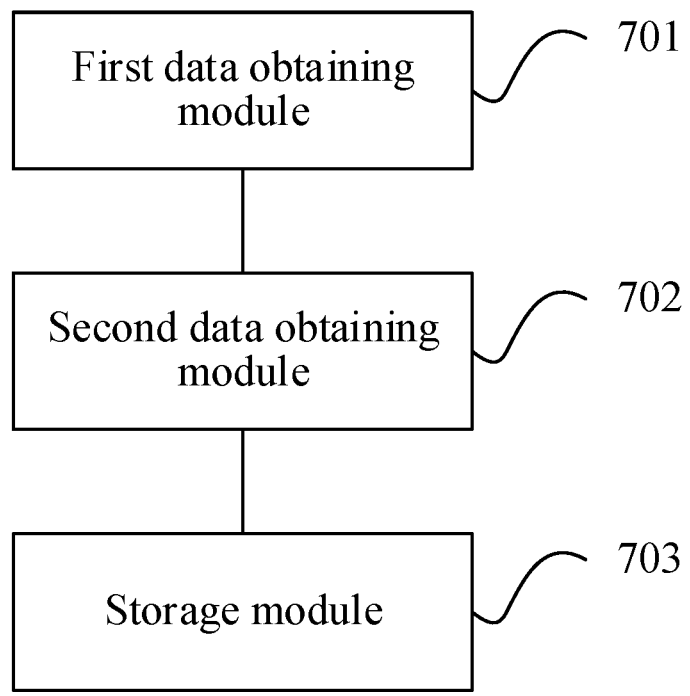
FIG. 7 is a schematic structural diagram of a data storage apparatus according to an embodiment of this application.

FIG. 7 is a schematic structural diagram of a data storage apparatus according to an embodiment of this application. The apparatus is applied to a first node of a data storage system. Referring to FIG. 7, the apparatus includes:

a first data obtaining module 701, configured to obtain first data of a target object;
a second data obtaining module 702, configured to obtain second data of the target object, the first data and the second data being data of different dimensions, the dimensions being information for measuring any aspect of the target object from generation to existence; and
a storage module 703, configured to store the first data and the second data of the target object in the first node.

In some embodiments, the first data of the target object includes a remaining life cycle of the target object in a current phase, and the second data of the target object includes transaction data of the target object in the current phase.

In some embodiments, the remaining life cycle of the target object in the current phase is a difference between a remaining life cycle of a previous phase and a time consumption of the current phase.

In some embodiments, the time consumption of the current phase may be set according to a feature of the current phase.

In some embodiments, the transaction data of the target object in the current phase includes transaction data of the target object in each link of the current phase.

In some embodiments, the transaction data of the target object in the current phase further includes signature data of the transaction data of the target object in each link of the current phase.

In some embodiments, the first data of the target object includes a resource consumption surplus of the target object in the current phase, and the second data of the target object includes transaction data of the target object in the current phase.

In some embodiments, the apparatus further includes:
a third data obtaining module, configured to obtain third data of the target object, where the third data is correlated with the first data and the second data.

The storage module is further configured to store the third data of the target object in the first node while storing the first data and the second data of the target object in the first node.

In some embodiments, the third data of the target object includes the resource consumption surplus of the target object in the current phase.

In some embodiments, the resource consumption surplus of the target object in the current phase is a difference between a resource consumption surplus of the previous phase and a resource consumption amount of the current phase.

In some embodiments, the resource consumption amount of the current phase is a sum of resource consumption amounts of the target object in all links of the current phase.

In some embodiments, the resource consumption surplus is a carbon emission surplus.

In some embodiments, the apparatus further includes:
an audit information obtaining module, configured to receive audit information of the first node, where the audit information is used for indicating the data stored in the first node; and
a transmitting module, configured to broadcast the audit information of the first node to a plurality of second nodes in the data storage system.

In some embodiments, the audit information includes the data stored in the first node.

In some embodiments, the audit information includes data stored in the first node within a preset period of time.

In some embodiments, the audit information includes an eigenvalue of the data stored in the first node.

In some embodiments, the audit information includes an eigenvalue of data stored in the first node within a preset period of time.

In some embodiments, an eigenvalue is a hash value.

In some embodiments, the audit information includes signature data, where the signature data is obtained by the first node by signing the data stored in the first node with a private key of the first node.

In some embodiments, the audit information further includes a public key of the first node.

In some embodiments, the audit information further includes context signature data obtained by the first node by signing context information of the current phase with a private key, where the context information includes at least one of a timestamp, geographic address information, and network address information.

In some embodiments, the storage module is configured to store the first data and the second data of the target object in a resource pool of the first node; and store the first data and the second data stored in the resource pool into a preset storage space of the first node when a consensus acknowledgment notification transmitted by any second node is received.

In some embodiments, the storage module is configured to store the first data and the second data of the target object in the first node when a consensus acknowledgment notification transmitted by any second node is received.

In some embodiments, the apparatus further includes a comparing module, where the comparing module is configured to cross-compare obtained data of at least two dimensions, and trigger the storage module to perform a storage step when the comparing module determines that the obtained data of the at least two dimensions matches each other.

In some embodiments, the apparatus further includes:
a barcode module, configured to provide a barcode on a product produced in any phase, where an address to which the barcode is directed is used for providing at least one of latest first data of the target object, latest second data of the target object, or latest third data of the target object.

In some embodiments, the barcode further provides network addresses of a plurality of second nodes so that a scanning terminal transmits scanned data to the plurality of second nodes for verification.

Figure 8:
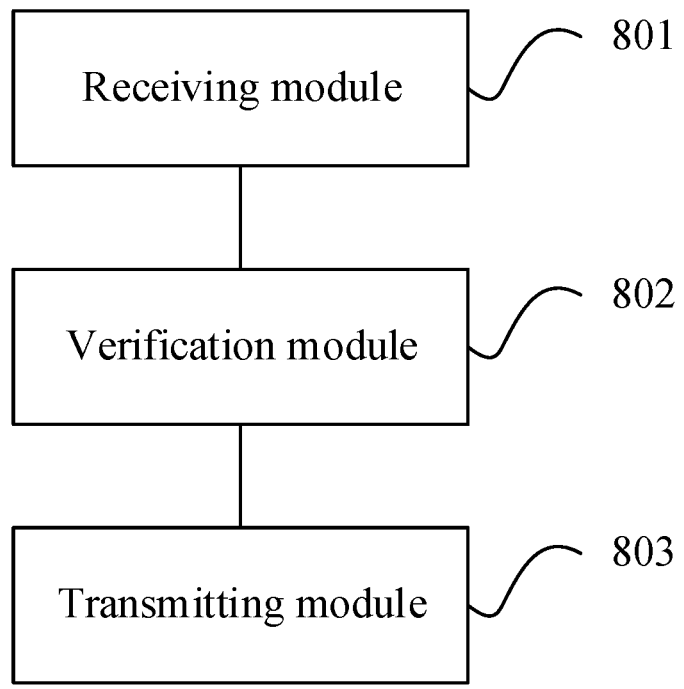
FIG. 8 is a schematic structural diagram of a data verification apparatus according to an embodiment of this application.

FIG. 8 is a schematic structural diagram of a data verification apparatus according to an embodiment of this application. The apparatus is applied to any second node of a data storage system, where a consensus mechanism is configured for a plurality of second nodes in the data storage system. Referring to FIG. 8, the apparatus includes:

- a receiving module 801, configured to receive audit information of a first node, the audit information being used for indicating data stored in the first node;
- a verification module 802, configured to verify the audit information based on target audit information of at least one target node; and
- a transmitting module 803, configured to broadcast a verification success notification in the data storage system in a case that the verification succeeds.

The verification module 802 is further configured to determine that a consensus on the audit information is reached in a case that the received verification success notification meets a consensus success condition.

In some embodiments, the transmitting module 802 is further configured to transmit a consensus acknowledgment notification to the first node in a case that a consensus on the audit information is reached. The target audit information is used for indicating data stored by each target first node that transacts with the first node.

In some embodiment, the verification module 802 is configured to:

- obtain, according to the audit information, target audit information uploaded by the at least one target node, compare the target audit information of the at least one target node with the audit information, and determine that the audit information passes the verification if the target audit information of the at least one target node matches the audit information.

In some embodiments, the verification module 802 is configured to: obtain a public key in at least one piece of signature data in the audit information; use a first node corresponding to the obtained public key as the at least one target node; obtain, according to the public key, audit information that includes the first node corresponding to the public key and use the audit information as the target audit information of the at least one target node.

In some embodiments, the at least one target node is a counterparty of a transaction indicated by the audit information.

In some embodiments, the at least one target node includes a node corresponding to each production element of a current phase and a node corresponding to the target object in a previous phase of the current phase.

In some embodiments, a data storage system is provided. The system includes a plurality of first nodes and a plurality of second nodes, a consensus mechanism being configured for the plurality of second nodes in the data storage system;

each of the plurality of first nodes being configured to: obtain first data of a target object; obtain second data of the target object, the first data and the second data being data of different dimensions; store the first data and the second data of the target object in the first node, and obtain audit information of the first node, the audit information being used for indicating the data stored in the first node; and broadcast the audit information of the first node to the plurality of second nodes in the data storage system; and each of the plurality of second nodes being configured to: receive the audit information of the first node, the audit information being used for indicating the data stored in the first node; verify the audit information based on target audit information of at least one target node; broadcast a verification success notification in the data storage system in a case that the verification succeeds; and determine that a consensus on the audit information is reached in a case that the received verification success notification meets a consensus success condition.

All the foregoing optional technical solutions may be combined in any way to form an optional embodiment of this disclosure, and details are not described herein.

In some embodiments, a computer device is provided. The computer device includes a processor and a memory, the memory storing at least one instruction, the instruction being loaded and executed by the processor to implement the steps of the foregoing data storage method. The steps of the data storage method herein may be the steps of the data storage method in the foregoing embodiments.

In some embodiments, a non-transitory computer-readable storage medium is provided. The storage medium stores at least one instruction, the instruction being loaded and executed by a processor to implement the steps of the foregoing data verification method. The steps of the data storage method herein may be the steps of the data storage method in the foregoing embodiments.

In some embodiments, a computer device is provided. The computer device includes a processor and a memory, the memory storing at least one instruction, the instruction being loaded and executed by the processor to implement the steps of the foregoing data verification method. The steps of the data verification method herein may be the steps of the data verification method in the foregoing embodiments.

In some embodiments, a non-transitory computer-readable storage medium is provided. The storage medium stores at least one instruction, the instruction being loaded and executed by a processor to implement the steps of the foregoing data verification method. The steps of the data verification method herein may be the steps of the data verification method in the foregoing embodiment.

In some embodiments, a data storage system is provided. The system includes a plurality of first nodes and a plurality of second nodes, a consensus mechanism being configured for the plurality of second nodes in the data storage system;

each of the plurality of first nodes being configured to: obtain first data of a target object; obtain second data of the target object, the first data and the second data being data of different dimensions, the dimensions being information for measuring any aspect of the target object from generation to existence; store the first data and the second data of the target object in the first node, and obtain audit information of the first node, the audit information being used for indicating the data stored in the first node; and broadcast the audit information of the first node to the plurality of second nodes in the data storage system; and each of the plurality of second nodes being configured to: receive the audit information of the first node, the audit information being used for indicating the data stored in the first node; verify the audit information based on target audit information of at least one target node; broadcast a verification success notification in the data storage system in a case that the verification succeeds; and determine that a consensus on the audit information is reached in a case that the received verification success notification meets a consensus success condition.

What is claimed is:

1. A data storage method, executed by a data storage system including a first node and a second node that is communicatively connected to the first node, the method comprising:

obtaining first data of a target object;
obtaining second data of the target object, the first data and the second data being data of different dimensions, the dimensions being information for measuring any aspect of the target object from generation to existence;
storing the first data and the second data of the target object in the first node;
receiving audit information of the first node, the audit information being used for indicating the first data and the second data stored in the first node;
verifying the audit information based on target audit information of at least one target node, wherein the target audit information is used for indicating data stored by the at least one target node that transacts with the first node;
broadcasting a verification success notification in the data storage system in a case that the verification succeeds; and
determining that a consensus on the audit information is reached in a case that the received verification success notification meets a consensus success condition.

2. The method according to claim 1, wherein the first data of the target object comprises a remaining life cycle of the target object in a current phase, and the second data of the target object comprises transaction data of the target object in the current phase.

3. The method according to claim 1, wherein the first data of the target object comprises a resource consumption surplus of the target object in a current phase, and the second data of the target object comprises transaction data of the target object in the current phase.

4. The method according to claim 3, wherein the resource consumption surplus is a carbon emission surplus.

5. The method according to claim 1, further comprising:
obtaining third data of the target object, wherein the third data is correlated with the first data and the second data; and
storing the third data of the target object in the first node while storing the first data and the second data of the target object in the first node.

6. The method according to claim 5, wherein the third data of the target object comprises the resource consumption surplus of the target object in the current phase.

7. The method according to claim 5, further comprising:
providing a barcode on a product produced in any phase, wherein an address to which the barcode is directed is used for providing at least one of latest first data, latest second data, and latest third data of the target object.

8. The method according to claim 7, wherein the barcode further provides network addresses of a plurality of second nodes, so that a scanning terminal transmits scanned data to the second nodes for verification.

9. The method according to claim 1, further comprising:
obtaining audit information of the first node, wherein the audit information is used for indicating the data stored in the first node; and
broadcasting the audit information of the first node to a plurality of second nodes in the data storage system.

10. The method according to claim 9, wherein the audit information comprises data stored in the first node within a preset period of time.

11. The method according to claim 9, wherein the audit information further comprises context signature data obtained by the first node by signing context information of a current phase with a private key, the context information comprising at least one of a timestamp, geographic address information, and network address information.

12. The method according to claim 9, wherein the storing the first data and the second data of the target object in the first node comprises:
storing the first data and the second data of the target object in a resource pool of the first node; and
storing the first data and the second data stored in the resource pool into a preset storage space of the first node in a case that a consensus acknowledgment notification transmitted by any of the second nodes is received.

13. The method according to claim 1, further comprising:
cross-comparing obtained data of at least two dimensions and performing a storage operation in a case that the obtained data of the at least two dimensions matches each other.

14. The method according to claim 1, further comprising:
transmitting a consensus acknowledgment notification to the first node in a case that a consensus on the audit information is reached.

15. The method according to claim 1, wherein the verifying the audit information based on target audit information of at least one target node comprises:
obtaining, according to the audit information, the target audit information uploaded by the at least one target node;
comparing the target audit information of the at least one target node with the audit information; and
determining that the audit information passes the verification in a case that the target audit information of the at least one target node matches the audit information.

16. A data storage system comprising a first node and a second node that is communicatively connected to the first node, wherein each of the first node and the second node has a processor and a memory, the memory storing at least one instruction, the instruction being loaded and executed by the processor to perform a plurality of operations including:
obtaining, at the first node, first data of a target object;
obtaining, at the first node, second data of the target object, the first data and the second data being data of different dimensions, the dimensions being information for measuring any aspect of the target object from generation to existence;
storing, at the first node, the first data and the second data of the target object;
receiving, at the second node, audit information of the first node, the audit information being used for indicating the first data and the second data stored in the first node;
verifying, at the second node, the audit information based on target audit information of at least one target node, wherein the target audit information is used for indicating data stored by the at least one target node that transacts with the first node;
broadcasting, at the second node, a verification success notification in the data storage system in a case that the verification succeeds; and
determining, at the second node, that a consensus on the audit information is reached in a case that the received verification success notification meets a consensus success condition.

17. The data storage system according to claim 16, wherein the first data of the target object comprises a remaining life cycle of the target object in a current phase, and the second data of the target object comprises transaction data of the target object in the current phase.

18. The data storage system according to claim 16, wherein the first data of the target object comprises a resource consumption surplus of the target object in a current phase, and the second data of the target object comprises transaction data of the target object in the current phase.

19. The data storage system according to claim 16, wherein the plurality of operations further comprise:
    obtaining, at the first node, third data of the target object, wherein the third data is correlated with the first data and the second data; and
    storing, at the first node, the third data of the target object in the first node while storing the first data and the second data of the target object in the first node.

20. A non-transitory computer-readable storage medium in connection with a data storage system having a first node and a second node that is communicatively connected to the first node, the storage medium storing at least one instruction, the instruction being loaded and executed by a processor of one of the first node and the second node to perform a plurality of operations including:
    obtaining, at the first node, first data of a target object;
    obtaining, at the first node, second data of the target object, the first data and the second data being data of different dimensions, the dimensions being information for measuring any aspect of the target object from generation to existence;
    storing, at the first node, the first data and the second data of the target object;
    receiving, at the second node, audit information of the first node, the audit information being used for indicating the first data and the second data stored in the first node;
    verifying, at the second node, the audit information based on target audit information of at least one target node, wherein the target audit information is used for indicating data stored by the at least one target node that transacts with the first node;
    broadcasting, at the second node, a verification success notification in the data storage system in a case that the verification succeeds; and
    determining, at the second node, that a consensus on the audit information is reached in a case that the received verification success notification meets a consensus success condition.

* * * * *